(12) United States Patent
Cordasco

(10) Patent No.: US 10,949,491 B2
(45) Date of Patent: *Mar. 16, 2021

(54) METHOD AND APPARATUS FOR USING PROXIES TO INTERACT WITH WEBPAGE ANALYTICS

(71) Applicant: Acoustic, L.P., New York, NY (US)

(72) Inventor: Matthew Cordasco, San Francisco, CA (US)

(73) Assignee: Acoustic, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/728,710

(22) Filed: Dec. 27, 2019

(65) Prior Publication Data

US 2020/0133987 A1 Apr. 30, 2020

Related U.S. Application Data

(63) Continuation of application No. 15/907,651, filed on Feb. 28, 2018, now Pat. No. 10,521,486, which is a continuation of application No. 13/633,442, filed on Oct. 2, 2012, now Pat. No. 9,934,320, which is a continuation-in-part of application No. 13/401,725, filed on Feb. 21, 2012, now Pat. No. 8,914,736, and a continuation-in-part of application No. 12/750,607, filed on Mar. 30, 2010, now Pat. No. 8,930,818.

(60) Provisional application No. 61/545,105, filed on Oct. 7, 2011, provisional application No. 61/445,528, filed on Feb. 22, 2011, provisional application No. 61/165,084, filed on Mar. 31, 2009.

(51) Int. Cl.
*G06F 17/00* (2019.01)
*G06F 16/958* (2019.01)
*G06F 16/957* (2019.01)
*G06F 11/34* (2006.01)

(52) U.S. Cl.
CPC ........ *G06F 16/972* (2019.01); *G06F 16/9574* (2019.01); *G06F 16/986* (2019.01); *G06F 11/3438* (2013.01); *G06F 2201/86* (2013.01); *G06F 2201/88* (2013.01)

(58) Field of Classification Search
CPC .. G06F 16/973; G06F 16/9574; G06F 16/986; G06F 11/3438; G06F 2201/86; G06F 2201/88
See application file for complete search history.

*Primary Examiner* — Cesar B Paula
*Assistant Examiner* — James H. Blackwell
(74) *Attorney, Agent, or Firm* — Mauriel Kapouytian Woods LLP; Lana Akopyan; Michael Mauriel

(57) ABSTRACT

An overlay may be displayed over a webpage for displaying different analytics, such as displayed with heatmaps. The webpage is parsed to identify webpage objects. Proxy objects are generated for the identified webpage objects and displayed on Z-index layers above the overlay. The proxy objects are configured to detect and react to events on behalf of associated webpage objects. A mobile device proxy server may send mobile device requests on behalf of a desktop computing device and modify received webpages so the desktop computing device renders the webpages in substantially a same manner as a mobile device.

17 Claims, 9 Drawing Sheets

```
280
  <HTML>
    <Body>
      <Div>
        <A Href="link1" />      } 282
        <A Href="link2" />
      </Div>
      <Div> (Z-index)          290
        <canvas> (Z-index +1)
          Draw                  292
          SVG                                } 286
        </canvas>
        <Div> (Z-index +2)
          Proxy Object                       } 288
        </Div>
      </Div>
    </Body>
  </HTML>
```

METHOD AND APPARATUS FOR USING PROXIES TO INTERACT WITH WEBPAGE ANALYTICS

The present application is a continuation of U.S. patent application Ser. No. 15/907,651, filed Feb. 28, 2018, which is a continuation of U.S. patent application Ser. No. 13/633,442, filed Oct. 2, 2012, which claims priority to U.S. Provisional Patent Application Ser. No. 61/545,105, filed Oct. 7, 2011, which are herein incorporated by reference in their entireties.

U.S. patent application Ser. No. 13/633,442 is also a continuation-in-part of U.S. patent application Ser. No. 13/401,725, filed Feb. 21, 2012, which claims priority to U.S. Provisional patent application Ser. No. 61/445,528, filed Feb. 22, 2011, which are herein incorporated by reference in their entireties.

U.S. patent application Ser. No. 13/633,442 is also a continuation-in-part of U.S. patent application Ser. No. 12/750,607, filed Mar. 30, 2010, which claims priority to U.S. Provisional Application Ser. No. 61/165,084, entitled: filed Mar. 31, 2009, which are herein incorporated by reference in their entireties.

FIELD

This application relates generally to data processing and, more specifically, to overlaying information on webpages.

BACKGROUND

A client monitoring system may detect events, such as mouse clicks, selections, keystroke entries, etc. for different locations within a webpage. An analyses system may count the number of events for the different locations within the webpage and generate usage clusters. The usage clusters are visually displayed in a heatmap and show where the events happened within the webpage and the number of events at the different locations. For example, a darker usage cluster may represent more events in the associated webpage location and a lighter usage cluster may represent fewer events in the associated webpage location. In another example, usage clusters may be displayed in different colors to indicate different events or different numbers of events.

The heatmap may comprise an overlay displayed over the webpage and the usage clusters displayed within the overlay. The usage clusters may be aligned with associated webpage objects within the underlying webpage. This allows a user to visually associate the information provided by the usage clusters with associated underlying webpage objects. However, the overlay may block interaction with objects within the underlying webpage. For example, the overlay may be located at a higher Z-index level of the webpage and prevent lower level webpage objects from detecting events, such as mouseovers, mouse clicks, etc. Thus, the overlay may prevent or restrict user interaction with underlying webpages.

DETAILED DESCRIPTION

Figure 1:
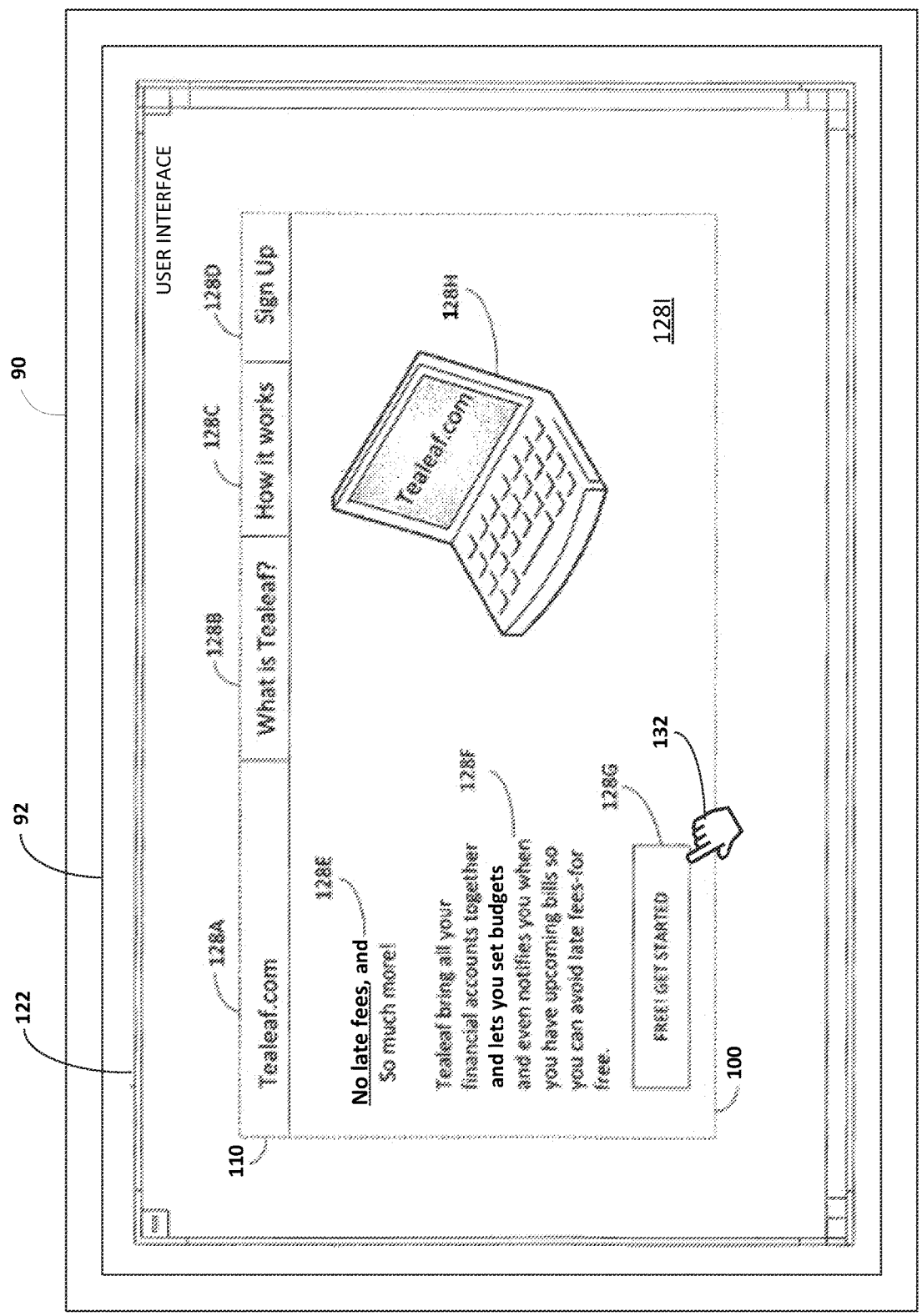
FIG. 1 depicts an example of a webpage.

FIG. 1 depicts an example of a computing device 90 having a screen 92 displaying a user interface 122. In one example, user interface 122 may comprise a web browser configured to display a webpage 100 after an operator logs into an associated website using an authorized user name and password. In another example, user interface 122 may be displayed via a mobile application operating on a mobile device. Computing device 90 may comprise a desktop computer, Personal Computer (PC), laptop computer, wireless Personal Digital Assistant (PDA), cellular telephone, smart phone or any other wired or wireless device that accesses and exchanges information with a website.

Computing device 90 may conduct web sessions with a web application operating on a website. The web application may support any type of online session such as online purchases or online financial services. Of course, these are just examples, and any type of electronic web based transaction or online activity may be performed in the web session between computing device 90 and the website.

Computing device 90 may communicate with the website over a network connection. The network connection may comprise any combination of connections over an Internet network, a wireless network, a telephone network, Public Services Telephone Network (PSTN), a cellular network, a Wi-Fi network, a cable network, a Wide Area Network (WAN), a Local Area Network (LAN), or the like, or any combination thereof.

During the web session, the website may send webpage 100 to computing device 90. Webpage 100 may contain multiple different webpage objects 128A-128H. For example, a tool bar 110 within webpage 100 may contain a webpage object 128A comprising text that identifies an Internet domain name for the website. A webpage object 128B may comprise a link to another webpage containing additional information regarding the website. A webpage object 128C may comprise another link to another webpage containing additional information regarding the website. A webpage object 128D may comprise a link to another webpage for signing up to the website.

A main body 128I of webpage 100 may include a webpage object 128E comprising a first block of text and a webpage object 128F comprising a second block of text. A webpage object 128G may comprise an icon and text that when selected link to yet another webpage for the website. A webpage object 128H may comprise an image representing additional information related to the website. Webpage objects 128 are just examples and any type of content and/or items that may be contained within webpage 100.

Tags may be attached to webpage objects 128 to detect different events. For example, Hyper-Text Markup Language (HTML) DIV tags may be used to define a division or a selection of objects within an HTML document. HTML DIV tags are just one example, and any objects may be used where events can be attached. For example, other objects may comprise, but are not limited to, an img, a span, an HTML tag "object", a Java object, a Silver Light object, a Flash object, or the like, or any combination thereof.

A user may move a cursor 132 over webpage object 128G and click a left mouse button or enter a keystroke on a keyboard of computing device 90. The DIV tag may detect selection of webpage object 128G and send an associated Hyper-Text Transfer Protocol (HTTP) request to the website (see FIG. 7). The web application on the website may send a new webpage in response to the HTTP request and computing device 90 may display the new webpage within user interface 122. Webpage objects 128 may be exposed within webpage 100 and therefore can detect associated events, such as the mouseover and/or webpage object selection.

Figure 2:
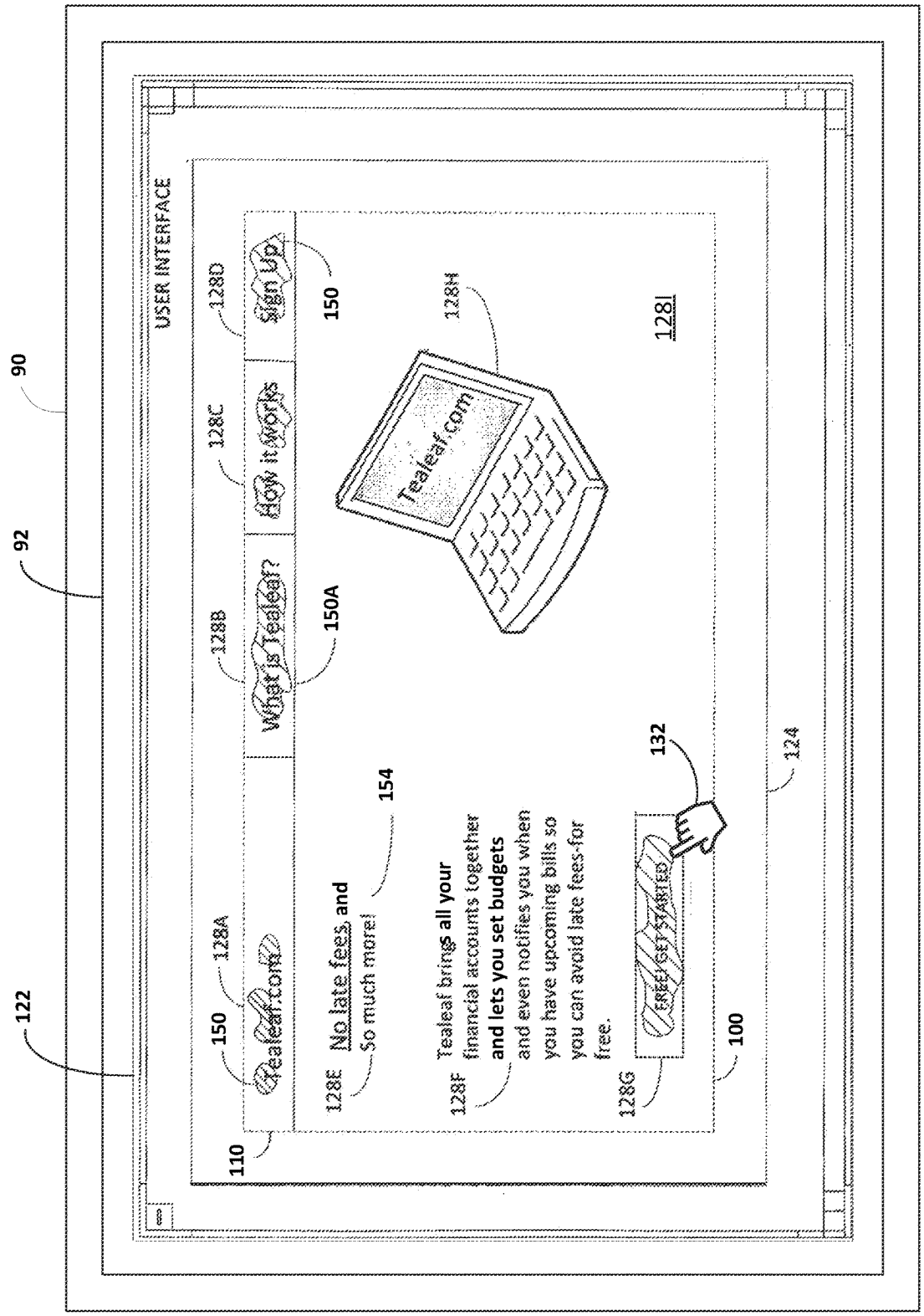
FIG. 2 depicts an example of a heatmap overlaid on top of a webpage.

FIG. 2 depicts an example of an overlay 124 displayed over webpage 100. In one example, a heatmap is displayed within overlay 124. Usage clusters 150 represent places on webpage 100 where users performed mouse clicks, selections, entered data, etc. In one example, usage clusters 150 become darker as more events are detected in the same general area. Displaying overlay 124 over webpage 100 and displaying a heatmap within overlay 124 is described in co-pending U.S. patent application Ser. Nos. 13/401,725 and 12/750,607 which have both been incorporated by reference in their entirety.

Overlay 124 may comprise an HTML object having a size configured to cover webpage 100. Overlay 124 may be displayed in a transparent color so underlying webpage objects 128 can be viewed in association with usage clusters 150. For example, a usage cluster 150A may indicate a number of mouse clicks for some defined time on underlying webpage object 128B during different user web sessions.

HTML comprises a Z-index property that specifies a stack order of HTML elements. An element with a greater stack order may be displayed in front of an element with a lower stack order. The object associated with overlay 124 may be located in a Z-index level above webpage 100 and may block access to webpage objects 128.

An operator may move cursor 132 over overlay 124 and may want to click on one of webpage objects 128. For example, the operator may want to open a pop-up window to view more detailed analytic information related to the selected webpage object 128. Since overlay 124 completely covers webpage 100 and is located at a higher Z-index layer, webpage objects 128 may not be able to detect and/or react to the user selection. Thus, overlay 124 disables user interaction with underlying webpage elements 128 and heatmap usage clusters 150.

Figure 3:
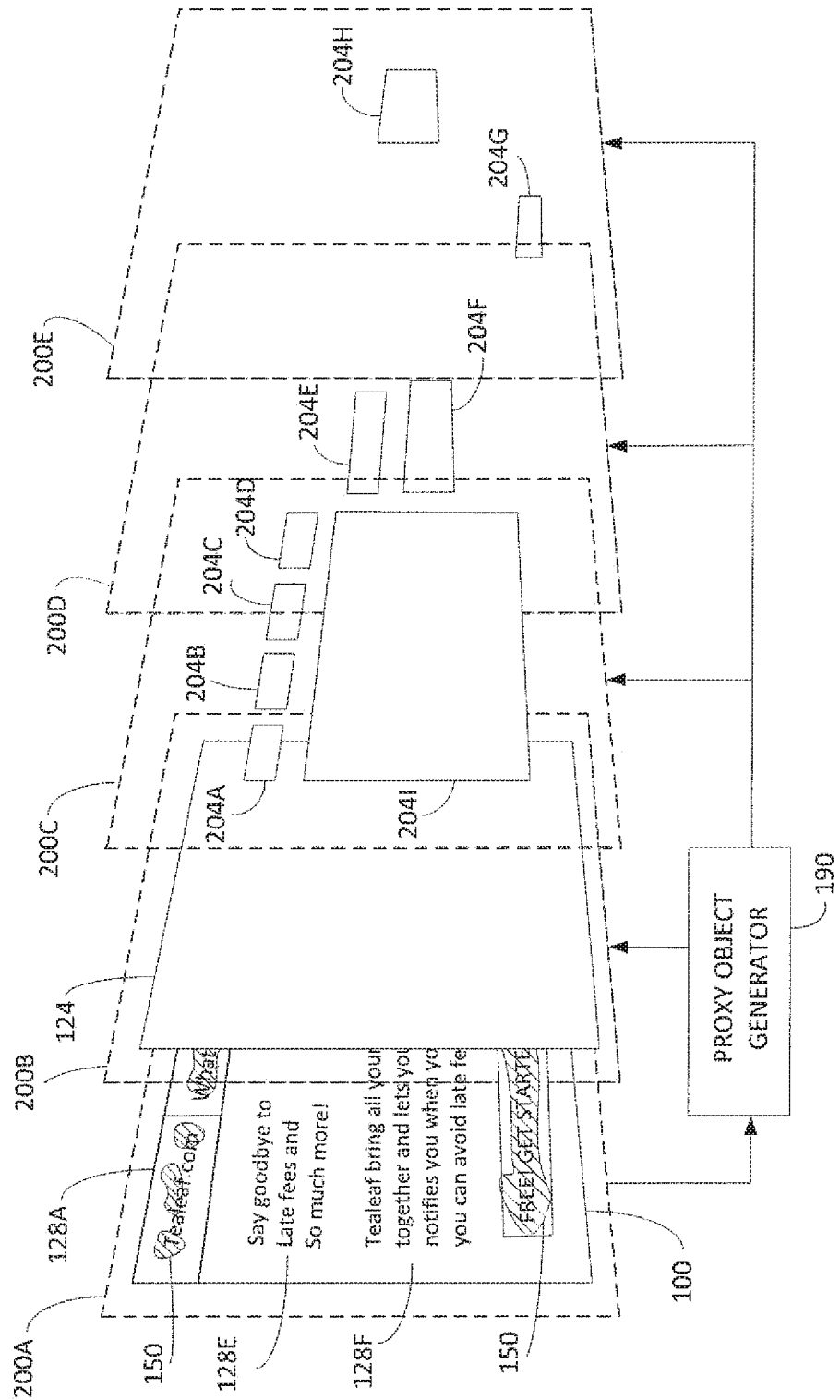
FIG. 3 depicts an example of proxy objects located on different Z-index layers above an overlay.

FIG. 3 depicts a conceptual drawing of the Z-index for the HTML stack comprising webpage 100 and overlay 124. Each dashed box 200 represents a different Z-index layer. For example, webpage 100 may be on a bottom Z-index layer 200A and webpage objects 128 within webpage 100 may be on incrementally higher Z-index layers 200. However, webpage 100 and webpage objects 128 are shown on a same Z-index layer 200A for illustrative purposes.

Analytics obtained from previously monitored web sessions may be generated and displayed as usage clusters 150 within a heatmap displayed over webpage 100. A proxy object generator 190 may generate an overlay 124 that contains the heatmap or may display overlay 124 over the heatmap. To enable operator interaction with webpage objects 128, proxy object generator 190 generates proxy objects 204 on Z-index layers above webpage 100 and overlay 124. Proxy objects 204 may be configured to act as proxies for detecting and reacting to events associated with underlying webpage objects 128. For example, proxy objects 204 can be configured to detect mouseovers and initiate actions, such as displaying pop-up windows associated with underlying webpage objects 128. Thus, proxy objects 204 convert previously static heatmaps into interactive overlays that can now detect and respond to operator initiated events.

Proxy object generator 190 may parse through the HTML Document Object Model (DOM) for webpage 100 and identify webpage objects 128. Proxy objects 204 are generated for the identified webpage objects 128. For example, a proxy object 204A may be generated for webpage object 128A, proxy object 204E may be generated for webpage object 128E, and proxy object 204F may be generated for webpage object 128F.

Proxy object generator 190 may identify a location and size of webpage objects 128 and create proxy objects 204 with corresponding sizes and locations. For example, proxy object generator 190 may identify a size and location of webpage object 128F within webpage 100. Proxy object generator 190 may create an associated proxy object 204F with substantially a same size and a same relative location as object 128F. Proxy object generator 190 then may display proxy object 204F as a box above overlay 124 that outlines webpage object 128F.

Each proxy object 204 may be located at a different Z-index layer 200 above overlay 124. However, for illustrative purposes some of proxy objects 204 in FIG. 3 are shown on a same Z-index level 200. For example, overlay 124 is shown on a second Z-index layer 200B. Proxy objects 204A, 204B, 204C, 204D, and 204I correspond to webpage objects 128A, 128B, 128C, 128D, and 128I, respectively, and are shown in Z-index layer 200C. However, each of proxy objects 204A, 204B, 204C, 204D, and 204I may be located on different Z-index layers 200.

Proxy objects 204E and 204F correspond to objects 128E and 128F, respectively, and are shown in Z-index layer 200D. However, each of proxy objects 204E and 204F also may be located in different Z-index layers. Proxy objects 204G and 204H correspond to objects 128G and 12811, respectively, and are shown in Z-index layer 200E, but again may be located in different Z-index layers.

In another example, a server may render webpage 100 as an image and supply the rendered image and coordinates for objects contained in webpage 100 to a client operating on a desktop computer. For example, the server may render a static JPEG or PNG image of webpage 100 using a browser engine, such as Chrome®. The server may generate a list of DOM objects within web page 100 and calculate locations and sizes of the DOM objects at the time of rendering. Generating lists of DOM objects for webpages is described in more detail below.

The image of the webpage and a list of objects and their X,Y properties and locations within the webpage may be sent from the server to the client operating on the desktop computer. The client computer may use the list of X,Y coordinates to position usability date such as heatmaps, link analytics, form analytics, etc. The client desktop computer may then display the usability data at the listed X,Y locations on one or more separate layers over the static webpage image. The client computer may generate and display other proxy objects including overlay 124 and proxy objects 204 over image 100 based on the X,Y coordinates provided by the server.

Rendering web page 100 and identifying associated objects on the server allows the server to operate in the browser environment used during the original web session. The client computer can then use a different web browser, or a different version of the web browser, to display the webpage image and associated proxy objects and analytic data.

Figure 4:
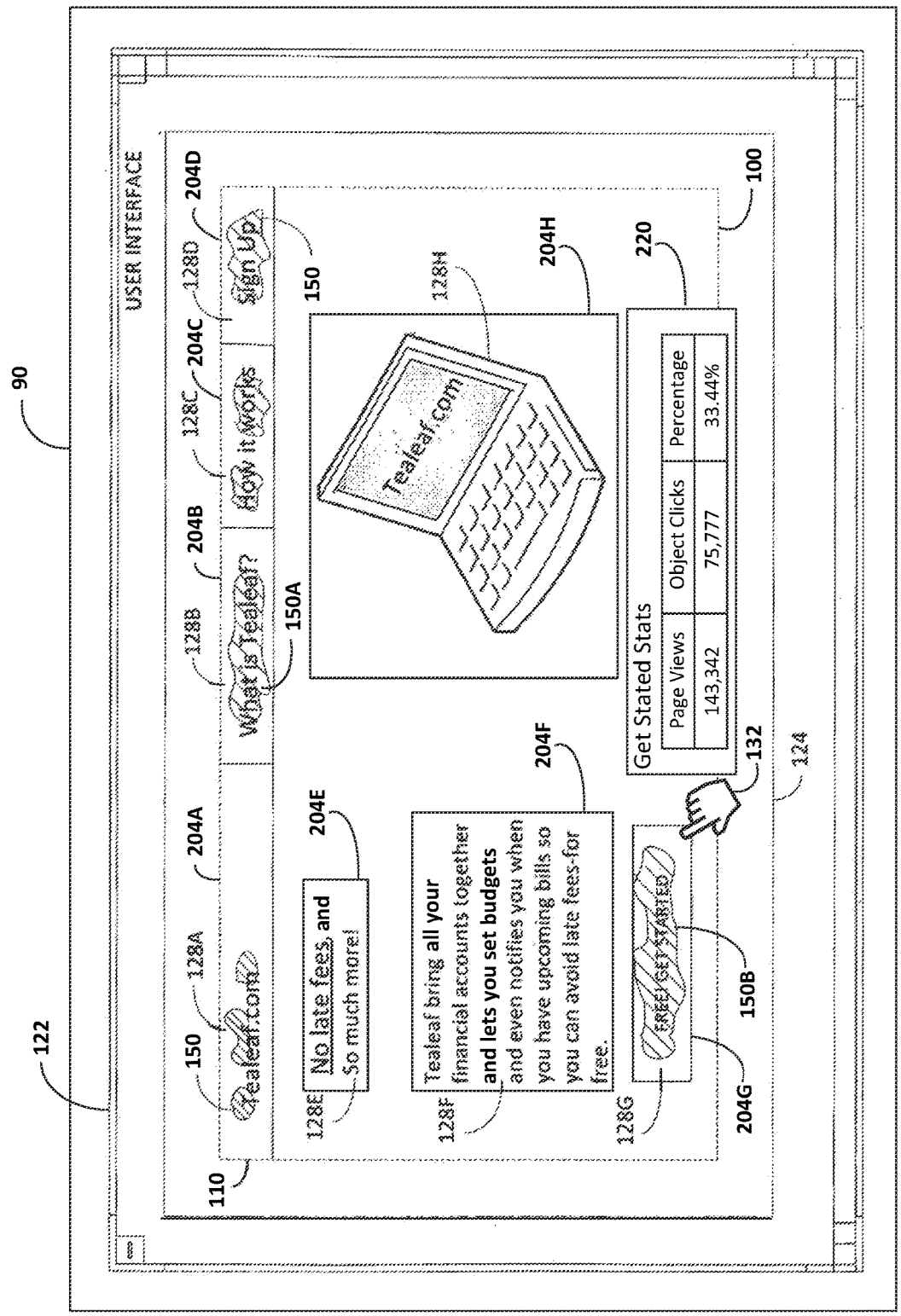
FIG. 4 depicts an example of proxy objects displayed within an overlay.

FIG. 4 depicts a one-dimensional view of proxy objects 204 displayed above overlay 124 and webpage 100. As mentioned above, proxy objects 204 may be displayed as outlines around associated webpage objects 128 within webpage 100. In another example, proxy objects 204 may comprise dots or dashed lines surrounding associated webpage objects 128. In yet another example, proxy objects 128 may be displayed as different semi-transparent colors within overlay 124 over associated webpage objects 128. In yet another example, proxy objects 204 may be completely transparent while being located over associated webpage objects 128.

Proxy objects 204 enable an operator to interact on behalf underlying webpage objects 128. For example, cursor 132 may be moved over webpage object 128G and associated proxy object 204G. Previously, events associated with webpage object 128G could not be detected due to blocking by overlay object 124. However, proxy object 204G is located in the Z-index stack above overlay 124 and can therefore detect movement of cursor 132 over associated webpage object 128G. Proxy objects 204 can detect any event previously detectable by webpage objects 128 and can provide any action that may have previously been initiated by webpage object 128.

For example, an analytics engine may generate analytics for webpage 100 and for individual webpage objects 128 within webpage 100. The on-page analytics engine may use Rich Internet Application (RIA) based, for example, on HTML 5, Adobe Flash or Microsoft Silverlight. In one example, the analytics engine may be implemented and operate as described in co-pending U.S. patent application Ser. No. 12/750,607, entitled: VISUALIZATION OF WEBSITE ANALYTICS, filed Mar. 30, 2010 which is incorporated by reference in its entirety.

Overlay 124 may operate in conjunction with the analytics engine for viewing, changing, and/or reporting the analytics information. For example, proxy object 204G may display a usage report 220 in response to detecting cursor 132 hovering or clicking on webpage object 128G. Report 220 can display information associated with webpage 100 and/or webpage object 128G. For example, report 220 may display a number of views for webpage 100, a number of clicks on webpage object 128G, a bounce rate percentage for webpage 100, or the like, or any combination thereof.

In one example, report 220 may provide more specific information associated with a usage cluster 150B displayed over webpage object 128G. For example, report 220 may indicate when the clicks associated with usage cluster 150B were detected, the number of clicks in usage cluster 150B that resulted in purchases, demographic information for the users associated with heat usage cluster 150B, or the like, or any combination thereof.

In another example, usage clusters 150 may not be displayed over certain portions of webpage 100. For example, the number of clicks on webpage object 128F may have been too small to generate a usage cluster 150. A user can still view analytic data associated with webpage object 128F by moving cursor 132 over associated proxy object 204F. Proxy object 204F may detect the mouseover and display a report identifying a number of mouse clicks and other analytic information associated with underlying webpage object 128F.

Proxy object generator 190 may also improve layouts for underlying webpages. For example, some webpages may have overlapping webpage objects where the image for the DIV of a first object uses a first area of the webpage and the image for the DIV of a second object uses a second larger area that overlaps some portion of the first object. The first object is at a lower Z-index level and may not be able to detect the events in the area overlapped by the second object.

Proxy object generator 190 may sort webpage objects 128 according to size and compensate for overlapping objects. For example, proxy objects 204 generated for larger sized webpage objects 128 may be located at lower Z-index levels than proxy objects 204 generated for smaller webpage objects 128. This may prevent larger proxy objects 204 from covering smaller proxy objects 204.

In another example, proxy object generator 190 may generate proxy objects 204 with reduced sizes or realigned positions compared with the associated webpage objects 128. This may provide clearer demarcations within overlay 124 between different underlying webpage objects 128. For example, a large webpage object 128 may fully or partially overlap one or more adjacent webpage objects 128. Proxy object generator 190 may generate a proxy object 204 having a smaller size than the associated larger webpage object 128. The proxy object 204 may be centered at a center location of associated larger webpage object 128. This may reduce an amount the proxy object 204 overlaps with adjacent proxy objects.

In yet another example, two webpage objects 128 may substantially overlap each other. Proxy object generator 190 may attach a DIV tag to a first proxy object 128 associated with a top one of the two overlapping webpage objects 204. The DIV tag may send detected events to the second underlying one of the proxy objects 204 associated with the bottom one of the two overlapping webpage objects 128 after the cursor hovers over the first overlying proxy object 204 for more than a predetermined time.

Figure 5:
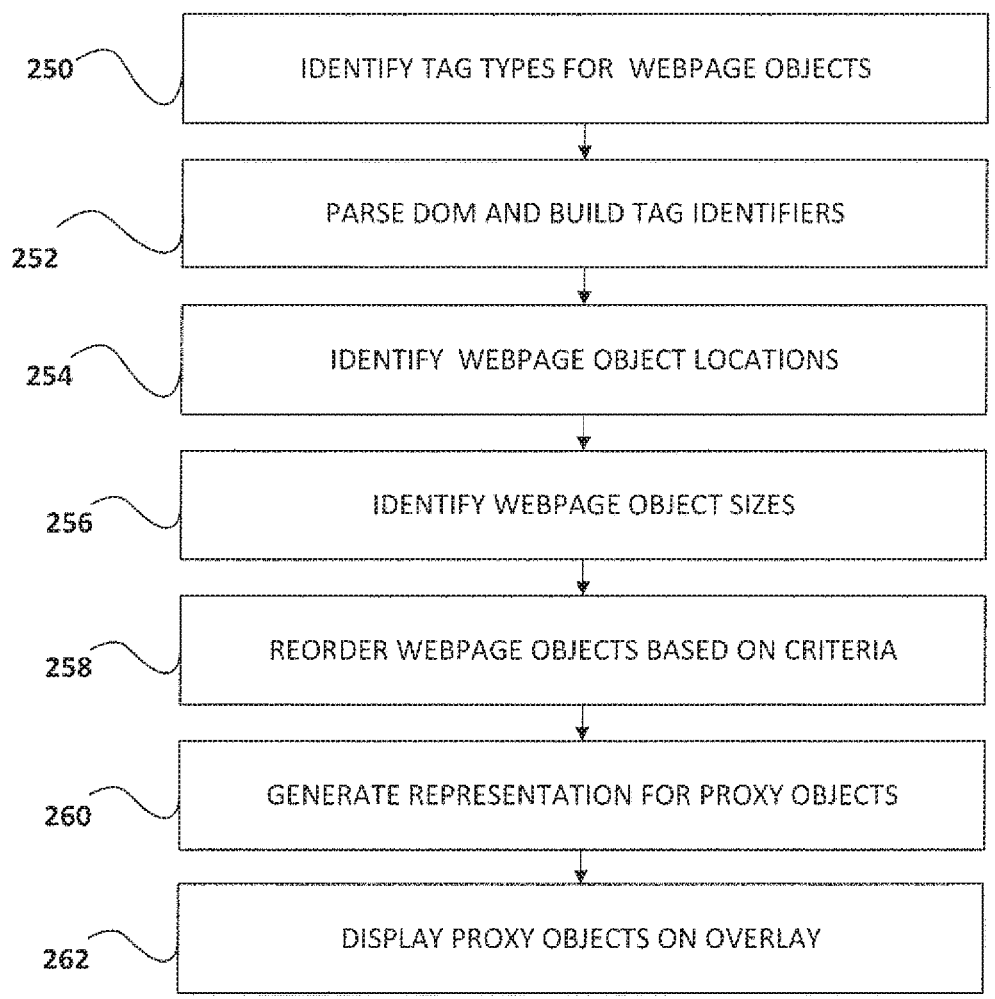
FIG. 5 depicts an example of a process for generating proxy objects.

FIG. 5 depicts an example of a process for generating proxy objects. In operation 250, tags types are identified for parsing through a webpage. For example, a configuration file may identify the HTML tag types for identifying in a webpage. Every tag within the HTML of the webpage may be identified as a default. In another example, an operator may select specific tag types for identifying in the webpage. The identified tag types may comprise anchor tags, DIVs, paragraphs, list items, or the like, or any combination thereof.

In operation 252, the Document Object Model (DOM) for the webpage may be parsed and the webpage objects identified in a list. The proxy object generator may start at a top of the webpage DOM and produce a list comprising unique identifiers for each webpage object associated with one of the identified tag types. In operation 254, locations of the webpage objects are identified. For example, X-Y locations are identified for a particular corner for each of the identified webpage objects within webpage 100. In operation 256, a size of webpage objects 128 are identified in the HTLM of webpage 100.

In operation 258, the webpage objects identified in the list may be reordered based on particular criteria. The list of webpage objects may originally be in the order they exist within the DOM of the webpage. Accordingly, the Z-indices for the list of webpage objects may be in the same order. The list may be reordered according to object size, tag types, etc. For example, larger webpage objects may be relocated in the list before smaller webpage objects. The proxy object generator may generate the proxy objects according to the order of the associated webpage objects in the list. Thus, a proxy object associated with a larger webpage object will be located at a lower Z-index level and not cover a proxy object associated with a smaller webpage object.

In another example, the webpage objects may be further reordered in the list according to tag types. For example, after reordering according to size, the list may be reordered so that anchor tags are located before DIV tags. The reordering may be performed automatically based on preconfigured user settings or may be manually reordered by the operator. Thus, proxy objects associated with DIV tags may be located on higher Z-index levels than proxy objects associated with anchor tags.

In operation 260, representations may be generated for the proxy objects. For example, box outlines similar to those shown in FIG. 4 may be generated for the proxy objects. The boxes may have substantially the same sizes as the associated webpage object sizes identified in operation 256. The boxes also may be assigned substantially the same relative X-Y locations as the associated webpage object locations identified in operation 254.

The proxy objects may be generated in any programming language, such as Flash or HTML5. For example, HTML5 for the proxy objects may comprise a DIV to display the proxy object within the overlay and include an event for detecting an onMouseOver or onClick operation.

In operation 262, the proxy objects are displayed above the overlay and may detect any corresponding events. For example, the proxy objects may detect any associated mouseover or mouse click in a designated region of the overlay and may generate an associated response, such as displaying an associated report as shown in FIG. 4. In another example, the proxy objects may display tables that allow the operator to select which types of charts are displayed when an event, such as a cursor selection is detected. In yet another example, the proxy object may display a table that allows the operator to select how the proxy objects are ordered in the Z-index above the overlay or select different tag types for generating associated proxy objects.

Figure 6:
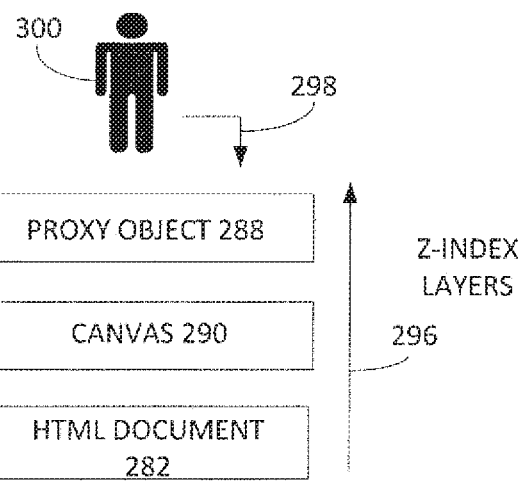
FIG. 6 depicts an example of Hyper Text Markup Language (HTML) code for generating proxy objects.

FIG. 6 depicts an example of HTML for a portion of the DOM of a webpage 280. Webpage objects originally reside within HTML document 282. It should be understood that FIG. 6 is just an example and any combination of different objects may reside in any language. In this example webpage objects comprise HTML links, but may comprise any definable webpage element. A HTML container 284 may be added at the bottom of the HTML document 282 that comprises objects at increasingly higher Z-index levels of the HTML stack.

Container 284 may include an overlay 286 and a proxy object 288. Container 284 may start at a next Z-index level above HTML document 282. Overlay 286 may comprise a canvas object 286 for drawing a heatmap that resides at a next higher Z-index layer above container 284. Drawing and SVG graphics 292 for canvas object 286 may be implemented using Java Script. Proxy object 288 may be located at a next higher Z-index layer above canvas object 286 and may comprise HTML code for displaying the proxy object and any attachments for detecting events.

Canvas object 286 is just one example of any possible object that may create a blocking condition in a desktop or mobile DOM. A Div is just one example of proxy object 288 and may by any object in a desktop or mobile DOM where an event can be attached. For example, the blocking objects and/or the proxy objects may be a DIV, an img, a span, an HTML tag "object", a Java object, a Silver Light object, a Flash object, or the like, or any combination thereof.

A conceptual Z-index 296 for webpage 280 shows HTML document 282 at a bottom layer of Z-index 296, canvas 290 at a next higher Z-index layer above HTML document 282, and proxy object 288 at a next higher Z-index layer above canvas 290. Accordingly, any events 298 entered by an operator 300 can be detected by proxy object 288 and will not be blocked by canvas 290.

The proxy objects inserted into webpage 280 may be less intrusive than other interactive schemes for displaying information in conjunction with webpage elements. For example, other schemes may inject additional display objects within HTML document 282 adjacent to associated webpage objects. Adding just one additional display object into the middle of HTML code may change how subsequent objects in the HTML code are displayed. For example, the added display objects may change where original webpage objects are displayed within HTML document 282 or may collide with other displayed webpage objects. Proxy object 288 is located above the Z-index levels for webpage objects in HTML document 282. This prevents the proxy objects from changing how the webpage objects are displayed in the original webpage.

In another example, the proxy object generator may be used for generating variations of webpage 280. For example, original webpage objects with webpage 280 may be displayed as proxy objects above the overlay. The overlay may cover and blank out the underlying original webpage objects and display images of the same webpage objects as proxy objects within the overlay. The operator may reposition, edit, remove, and/or add to the proxy objects above the overlay. After modifying the proxy objects above the overlay, the same changes may automatically be made to the HTML of the underlying webpage.

In another example, individual webpage objects may be imported into the overlay as proxy objects. A particular webpage object within the underlying webpage may be blanked out by the overlay. A proxy object associated with the imported webpage object may be displayed within the overlay over the blanked out underlying webpage object. Other webpage objects within the underlying webpage may be viewed through the overlay. The operator can edit, move, and/or replace the proxy object and view how the modified proxy object appears in combination with the other underlying webpage objects. After editing the proxy object, the HTML code for the modified proxy object may be inserted into the underlying webpage replacing the HTML code for the corresponding underlying webpage object.

Figure 7:
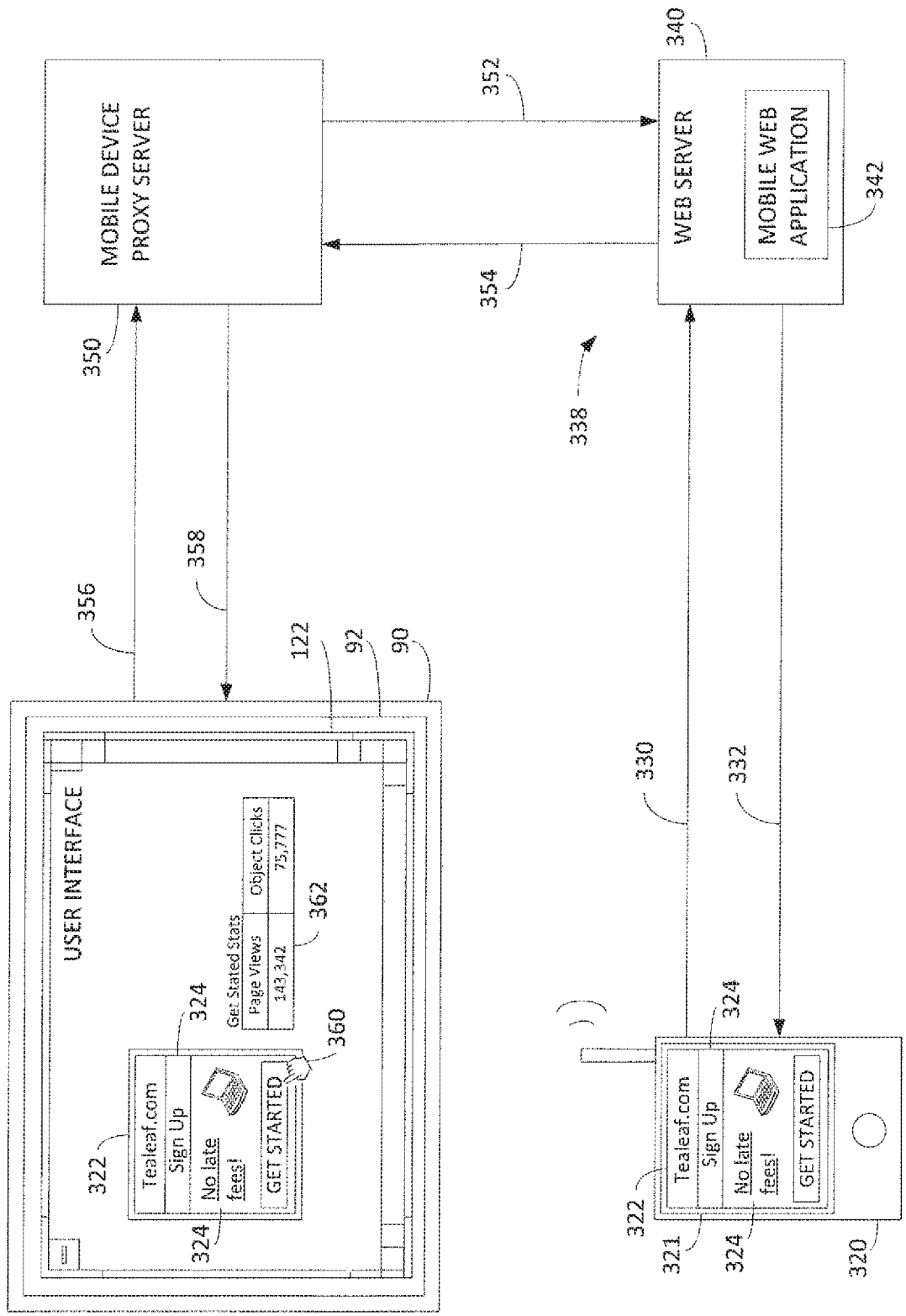
FIG. 7 depicts an example of a mobile device proxy server.

FIG. 7 depicts an example of a mobile device proxy server. An enterprise may operate a website 338 comprising a mobile web application 342 operating on web server 340. Web application 342 may be for any service, business, company, enterprise, individual or other entity that provides on-line information. A mobile device 320 may comprise any device that accesses content from web application 342. For example, mobile device 320 may comprise a tablet computer, hand-held device, smart telephone, mobile telephone, personal digital assistant (PDA), laptop computer, or the like, or any combination thereof.

In one example, mobile device 320 may run a mobile software application for accessing mobile web application 342. In one example, the mobile software application may comprise a mobile web browser. However, any type of mobile software application may be operated on mobile device 320. A user of mobile device 320 may be a customer or subscriber of the enterprise operating website 338. The mobile software application may send headers in a request 330 identifying a particular model of mobile device 320.

Web application 342 may send a response 332 back to mobile device 320 comprising HTML data. The mobile application or browser operating on mobile device 320 may render the HTML data as an electronic page 322 on screen 321.

An operator may be a person employed by the enterprise operating website 338 to manage content provided by web application 342. The operator may modify objects 324 in the electronic page 322 provided by mobile web application 342 to increase sales for products sold on website 338. For example, one of elements 324 may comprise an icon that a user selects when purchasing an item. The operator may want to change the color of the icon from green to red with the hope of causing more users to select the icon and purchase more associated items. In another example, the operator may want to redirect user activity to different webpages for website 338 or add new content for new products or services. The operator also may want to view analytics associated with electronic page 322. For example, the operator may want to view heatmaps showing user activity for different page objects 324.

A variant manager may operate on desktop computing device 90. The variant manager may open user interface 122 on computing device 90 and download electronic page 322 from web server 340. The variant manager also may display an overlay over electronic page 322 as described above. The overlay may be a transparent, semitransparent and/or opaque rendering and may allow the operator to see and manipulate objects 324 contained within electronic page 322 and/or view heatmaps associated with electronic page 322.

However, the size of screen 92 on desktop computing device 90 may be different from the size of screen 321 on mobile device 320. For example, computing device 90 may be a personal computer with a screen size of 1024×1080 pixels and mobile device 320 may be a smart phone with a screen size of 640×320 pixels. Desktop computing device 90 may operate a web browser that renders electronic page 322 over the entire user interface 122 and mobile device 320 may operate a mobile web browser that renders electronic page 322 over the entire screen 321.

Accordingly, the rendering of electronic page 322 on mobile device 320 may be different from the rendering of electronic page 322 on desktop computing device 90. The different renderings may prevent the operator on desktop computing device 90 from making accurate or optimal changes to electronic page 322. For example, one of objects 324 may be displayed clearly within user interface 122 of desktop computing device 90 but may be blurry or hard to decipher when displayed within screen 321 of mobile device 320.

A mobile device proxy server 350 provides the same rendering of electronic page 322 on mobile device 320 and on desktop computing device 90. For example, the operator may access electronic page 322 through a web browser/user interface 122. User interface 122 may send a HTTP request 356 to mobile web application 342 via mobile device proxy server 350. Mobile device proxy server 350 may forward a modified request 352 to web application 342. Modified request 352 may include mobile device tags similar to those sent by mobile device 320 in request 330. Web application 342 sends a response 354 back to proxy server 350 comprising the HTML and any other electronic data associated with mobile electronic page 322.

Mobile device proxy server 350 modifies electronic page 322 to provide a same mobile format rendered by mobile device 320 and returns the modified electronic page as response 358 back to desktop computing device 90. For example, HTML may not explicitly call out displaying electronic data page 322 in a 640×320 pixel format. However, the mobile browser operating on mobile device 320 may automatically render electronic page 322 in the 640×320 pixel format.

Mobile device proxy server 350 may modify HTML, Cascade Styling Sheets (CSS), etc., in electronic page 322 so that desktop computing device 90 provides the same rendering of electronic page 322 as mobile device 320. For example, mobile device proxy server 350 may modify the HTML within electronic page 332 to specifically call out a max_width=640 pixels and a max_height=320 pixels. The modified HTML may render electronic page 322 within desktop computing device 90 at the same size as electronic page 322 within mobile device 320. This allows the operator to more effectively observe and modify electronic page 322 on desktop computing device 90.

In one example, unused space within user interface 122 may be used for displaying other information associated with viewing or modifying electronic page 322. For example, the operator may move a cursor 360 over one of the objects 324 within electronic page 322 and click a mouse button or enter a keystroke. User interface 122 may display a window 362 identifying analytics for electronic page 322. For example, window 362 may identify a number of page views over some predefined time period or may identify a number of clicks on the selected object 324.

The mobile device proxy server 350 may operate in combination with the proxy object generator 190 described in FIG. 3. For example, mobile device proxy server 350 may cause electronic page 322 to be rendered by desktop computing device 90 in substantially the same manner as mobile device 320. Proxy object generator 190 then may be used for generating proxy objects for associated objects 324 within electronic page 322. Proxy object generator 190 may display an overlay over objects 324 and display associated proxy objects on Z-index levels above the overlay. The proxy objects may operate on behalf of the underlying objects 324 as described above.

Figure 8:
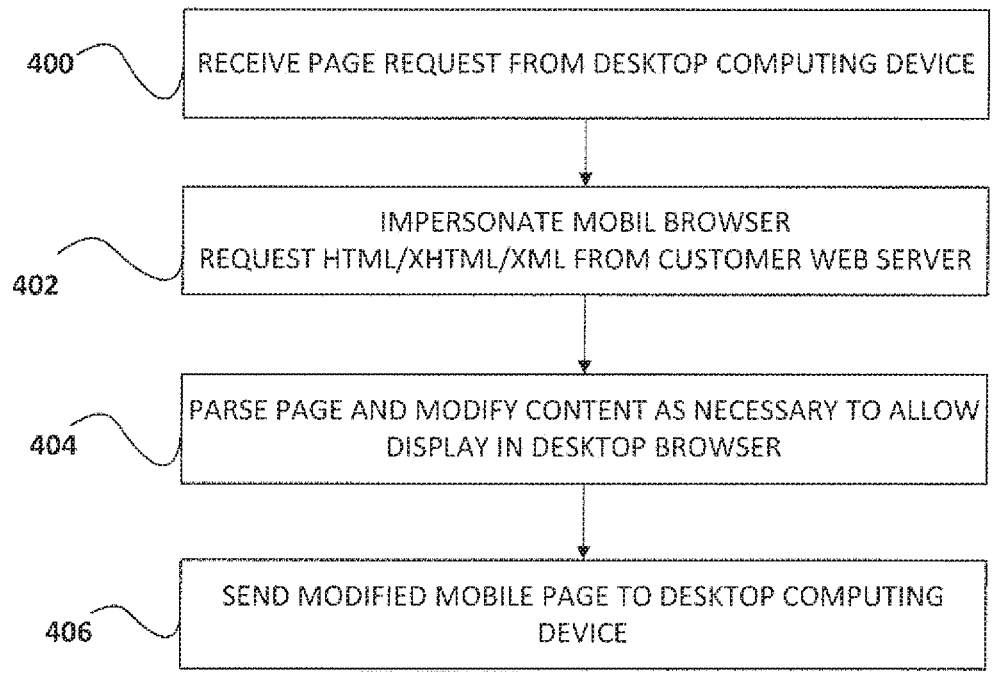
FIG. 8 depicts an example process for a mobile device proxy server.

FIG. 8 depicts an example process for a mobile device proxy server. In operation 400, a page request may be received from a desktop computing device. For example, a request may be received to change or alter the Universal Resource Locator (URL) of a page request to a mobile version. In operation 402, the proxy server may impersonate a mobile browser and request HTML, XHTML, or XML from a website. For example, the proxy server may add mobile device tags to the URL request. The proxy server may receive an electronic page back from the website associated with the impersonated type of mobile device.

In operation 404, the proxy server may parse through the electronic page received back from the website. The proxy server then may modify HTML, Java Script, XHTML, XML, CSS, or the like, or any combination thereof, so the desktop computing device renders the electronic page in substantially the same format as the mobile device. For example, maximum vertical and horizontal pixel widths for the electronic page may be defined to replicate a same screen size as the mobile device.

In operation 406, the modified electronic page is sent to the desktop computing device. The modified mobile page then may be rendered by the user interface on desktop browser in substantially the same format and size as rendered by the mobile browser operating on the mobile device.

Figure 9:
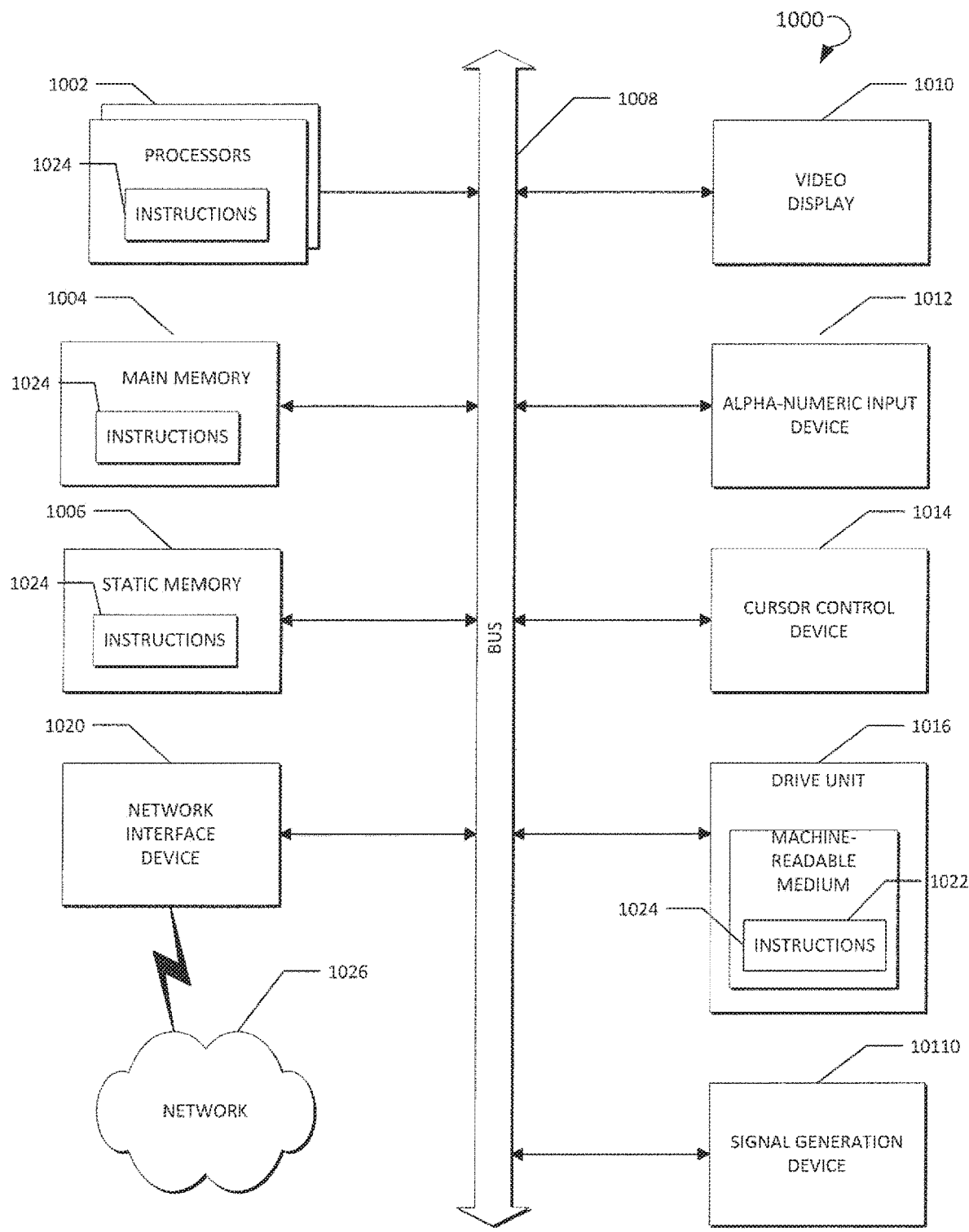
FIG. 9 depicts an example of a computing device for implementing a proxy object generator, a mobile device proxy server, and/or displaying webpage analytics.

FIG. 9 shows a diagrammatic representation of a computing device for a machine in the example electronic form of a computer system 1000, within which a set of instructions cause the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a Personal Digital Assistant (PDA), a cellular telephone, a portable music player (e.g., a portable hard drive audio device such as an Moving Picture Experts Group Audio Layer 3 (MP3) player, a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes an engine or multiple engines 1002 (e.g., a central processing unit (CPU), a graphics processing unit (GPU), or both), and a main memory 1004 and a static memory 1006, which communicate with each other via a bus 1008. The computer system 1000 can further include a video display unit 1010 (e.g., a liquid crystal displays (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a computer-readable medium 1022 on which is stored one or more sets of instructions and data structures (e.g., instructions 1024) embodying or utilized by any one or more of the methodologies or functions described herein. The instructions 1024 can also reside, completely or at least partially, within the main memory 1004 and/or within the engines 1002 during execution thereof by the computer system 1000. The main memory 1004 and the engines 1002 also constitute machine-readable media.

The instructions 1024 can further be transmitted or received over a network 1026 via the network interface device 1020 utilizing any one of a number of well-known transfer protocols (e.g., Hyper Text Transfer Protocol (HTTP), CAN, Serial, Modbus).

While the computer-readable medium 1022 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAMs), read only memory (ROMs), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, systems and methods for page setup and real-time content replacement in A/B testing have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

The detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Having described and illustrated the principles of various examples, it should be apparent that the examples may be modified in arrangement and detail without departing from such principles. Claim is made to all modifications and variations coming within the spirit and scope of the following claims.

The invention claimed is:

1. A non-transitory computer readable medium having program instructions embodied therewith, the program instructions executable by at least one processor to cause the at least one processor to:
identify webpage objects within a webpage, the webpage objects comprising visibly displayable content or visibly displayable items, the webpage objects configured to detect events associated with the webpage objects and initiate predetermined actions associated with the webpage objects in response to detecting the events, the webpage residing on a first layer of a stack order for displaying elements;
generate proxy objects associated with the webpage objects;
display an overlay over the webpage providing information pertaining to one or more of the webpage objects, the overlay residing on a second different layer of the stack order; and
display the proxy objects over the overlay on one or more third different layers of the stack order such that the proxy objects and the overlay are at least partially visible, the overlay of the second layer residing between the webpage of the first layer and the proxy objects of the one or more third layers and preventing the webpage objects from detecting the events, and the proxy objects configured to detect the events on the one or more third layers associated with the webpage objects of the first layer and provide the predetermined actions associated with the webpage objects of the first layer in response to detecting the events on the one or more third layers.

2. The non-transitory computer readable medium of claim 1, wherein the program instructions further cause the at least one processor to:
receive a request from a desktop computing device for the webpage, wherein the webpage is configured for displaying on a mobile device;
send a mobile device request on behalf of the desktop computing device for the webpage;
receive back the webpage;
modify the webpage to render on the desktop computing device in substantially a same manner as on the mobile device; and
send the modified webpage to the desktop computing device for rendering by the desktop computing device.

3. The non-transitory computer readable medium of claim 1, wherein the program instructions further cause the at least one processor to:
display the visible content of the webpage objects or the visible items of the webpage objects;
display the overlay providing visible information pertaining to one or more of the webpage objects; and
visibly display the proxy objects associated with the webpage objects.

4. The non-transitory computer readable medium of claim 1, wherein the program instructions further cause the at least one processor to:
display the visible content of the webpage objects or the visible items of the webpage objects;
display the overlay providing visible information pertaining to one or more of the webpage objects;
visibly display the proxy objects associated with the webpage objects, wherein at least one of the proxy objects visibly outlines at least one of the webpage objects.

5. The non-transitory computer readable medium of claim 1, wherein the program instructions further cause the at least one processor to:
displaying the visible content of the webpage objects or the visible items of the webpage objects;
displaying the overlay providing visible information pertaining to one or more of the webpage objects; and
visibly displaying the proxy objects associated with the webpage objects so as to semi-transparently cover a portion of the visible content of webpage objects or the visible items of webpage objects.

6. The non-transitory computer readable medium of claim 1, wherein the program instructions further cause the at least one processor to:
display the visible content of the webpage objects or the visible items of the webpage objects;
display the overlay providing visible information pertaining to one or more of the webpage objects, wherein the visible information comprises a heatmap; and
visibly display the proxy objects associated with the webpage objects.

7. The non-transitory computer readable medium of claim 1, wherein the program instructions further cause the at least one processor to:
display the visible content of the webpage objects or the visible items of the webpage objects;
display the overlay providing visible information pertaining to one or more of the webpage objects, wherein the visible information comprises a heatmap and wherein the heatmap is displayed so as to partially or incompletely visibly cover visible content or visible items of at least one of the webpage objects; and
visibly display the proxy objects associated with the webpage objects.

8. A method comprising:
identifying webpage objects within a webpage, the webpage objects comprising visibly displayable content or visibly displayable items, the webpage objects configured to detect events associated with the webpage objects and initiate predetermined actions associated with the webpage objects in response to detecting the events, the webpage residing on a first layer of a stack order for displaying elements;
generating proxy objects associated with the webpage objects;
displaying an overlay over the webpage providing information pertaining to one or more of the webpage objects, the overlay residing on a second different layer of the stack order; and
displaying the proxy objects over the overlay on one or more third different layers of the stack order such that the proxy objects and the overlay are at least partially visible, the overlay of the second layer residing between the webpage of the first layer and the proxy objects of the one or more third layers and preventing the webpage objects from detecting the events, and the proxy objects configured to detect the events on the one or more third layers associated with the webpage objects of the first layer and provide the predetermined actions associated with the webpage objects of the first layer in response to detecting the events on the one or more third layers.

9. The method of claim 8, comprising:
receiving a request from a desktop computing device for the webpage;
sending a mobile device request for the webpage to a website;

receiving back the webpage, the webpage configured to be rendered by a mobile device;

modifying the webpage to render on the desktop computing device in substantially a same manner as on the mobile device; and send the modified webpage to the desktop computing device for rendering by the desktop computing device.

10. The method of claim 8, comprising:

displaying the visible content of the webpage objects or the visible items of the webpage objects;

displaying the overlay providing visible information pertaining to one or more of the webpage objects; and visibly displaying the proxy objects associated with the webpage objects.

11. The method of claim 8, comprising:

displaying the visible content of the webpage objects or the visible items of the webpage objects;

displaying the overlay providing visible information pertaining to one or more of the webpage objects;

visibly displaying the proxy objects associated with the webpage objects, wherein at least one of the proxy objects visibly outlines at least one of the webpage objects.

12. The method of claim 8, comprising:

displaying the visible content of the webpage objects or the visible items of the webpage objects;

displaying the overlay providing visible information pertaining to one or more of the webpage objects; and visibly displaying the proxy objects associated with the webpage objects so as to semi-transparently cover a portion of the visible content of webpage objects or the visible items of webpage objects.

13. The method of claim 8, comprising:

displaying the visible content of the webpage objects or the visible items of the webpage objects;

displaying the overlay providing visible information pertaining to one or more of the webpage objects, wherein the visible information comprises a heatmap; and visibly displaying the proxy objects associated with the webpage objects.

14. The method of claim 8, comprising:

displaying the visible content of the webpage objects or the visible items of the webpage objects;

displaying the overlay providing visible information pertaining to one or more of the webpage objects, wherein the visible information comprises a heatmap and wherein the heatmap is displayed so as to partially or incompletely visibly cover visible content or visible items of at least one of the webpage objects; and visibly displaying the proxy objects associated with the webpage objects.

15. A method comprising:

receiving a request from a desktop computing device for an electronic page;

sending a mobile device request for the electronic page to a website;

receiving back the electronic page, the electronic page configured to be rendered by a mobile device;

modifying the electronic page to render on the desktop computing device in substantially a same manner as on the mobile device;

parsing a Document Object Model (DOM) for the modified electronic page for page elements, the page elements comprising visibly displayable content or visibly displayable items, the page elements configured to detect events associated with the page elements and initiate predetermined actions associated with the page elements in response to detecting the events;

modifying the electronic page to include an overlay over the electronic page when rendered by the desktop computing device, the electronic page residing on a first layer of a stack order for displaying objects, and the overlay providing information pertaining to one or more of the page elements and residing on a second different layer of the stack order;

modifying the electronic page to include proxy objects displayed over the overlay on one or more third different layers of the stack order when rendered by the desktop computing device, such that the proxy objects and the overlay are at least partially visible, the overlay of the second layer residing between the electronic page of the first layer and the proxy objects of the one or more third layers and preventing the page elements from detecting the events, and wherein the proxy objects are configured to detect the events associated with the page elements of the first layer and provide the predetermined actions associated with the page elements of the first layer in response to detecting the events on the one or more third layers; and sending the modified electronic page to the desktop computing device for rendering by the desktop computing device.

16. The method of claim 15, comprising updating analytics for the associated webpage elements based on the proxy objects initiating the actions associated with the webpage elements.

17. The method of claim 15, comprising modifying the electronic page to include an overlay, wherein the overlay comprises a heatmap providing analytics for the electronic page, the heatmap preventing the page elements from detecting the events.

\* \* \* \* \*